(12) United States Patent
Han

(10) Patent No.: US 6,182,306 B1
(45) Date of Patent: Feb. 6, 2001

(54) SIDE-MOUNT TOILET VALVE

(75) Inventor: Joseph U. Han, Irvine, CA (US)

(73) Assignee: Fluidmaster, Inc., San Juan Capistrano, CA (US)

(*) Notice: Under 35 U.S.C. 154(b), the term of this patent shall be extended for 0 days.

(21) Appl. No.: 09/152,500

(22) Filed: Sep. 9, 1998

Related U.S. Application Data
(60) Provisional application No. 60/062,876, filed on Oct. 21, 1997.

(51) Int. Cl.[7] ............................................ A47K 4/00
(52) U.S. Cl. .............................. 4/665; 4/353; 137/270; 137/436; 137/437; 137/451; 138/89
(58) Field of Search ....................... 4/664, 665, 353, 4/415; 137/436, 437, 443, 441, 451, 270, 269, 883; 251/127; 138/89, 91, 42, 37

(56) References Cited

U.S. PATENT DOCUMENTS

| | | |
|---|---|---|
| 1,383,886 | 7/1921 | Webb, Sr. ............................ 4/353 X |
| 1,725,884 | 8/1929 | Reichert . |
| 1,901,633 | 3/1933 | Clemmons . |
| 2,595,937 * | 5/1952 | Graham .......................... 137/436 X |
| 2,738,851 | 3/1956 | Warch . |
| 3,015,827 | 1/1962 | Iwata .................................... 4/664 X |
| 3,428,964 | 2/1969 | Lucas ........................................ 4/665 |
| 3,449,000 | 6/1969 | Kane . |
| 3,533,437 * | 10/1970 | Young .............................. 137/436 X |
| 3,823,732 | 7/1974 | Elsby . |
| 3,870,084 * | 3/1975 | Gezari ...................................... 138/89 |
| 4,145,775 * | 3/1979 | Butler ........................................ 4/415 |
| 4,221,335 | 9/1980 | Shames et al. . |
| 4,338,964 * | 7/1982 | Schoepe .............................. 137/436 |
| 4,635,751 | 1/1987 | Howell . |
| 4,646,780 | 3/1987 | Spooner ............................... 137/426 |
| 4,764,996 * | 8/1988 | Pino .......................................... 4/415 |
| 4,938,245 * | 7/1990 | Schoepe et al. ................. 137/436 X |
| 5,228,152 * | 7/1993 | Fraley ........................................ 4/664 |
| 5,366,262 * | 11/1994 | Couvreur . |
| 5,487,507 * | 1/1996 | McDonald et al. . |

FOREIGN PATENT DOCUMENTS

| | | | |
|---|---|---|---|
| 10716 * | 5/1899 | (GB) .................................... 137/436 |
| 1014614 * | 12/1965 | (GB) .................................... 137/443 |

* cited by examiner

*Primary Examiner*—Henry J. Recla
*Assistant Examiner*—Kathleen J. Prunner
(74) *Attorney, Agent, or Firm*—Myers, Dawes & Andras LLP

(57) ABSTRACT

A toilet fill valve includes an outlet pipe associated with a wash basin, an outlet tube associated with a wet-bowl configuration and an outlet assembly for filling the tank of the toilet. A blocking device includes a first plug for blocking the pipe in the absence of a wash basin, and a second plug for blocking the outlet tube in the absence of a wet-bowl configuration. An outlet assembly includes a deflector for directing water against a side wall of the tank, and an aerator for adding turbulence to the water in order to minimize noise associated with filling the tank with water.

11 Claims, 7 Drawing Sheets

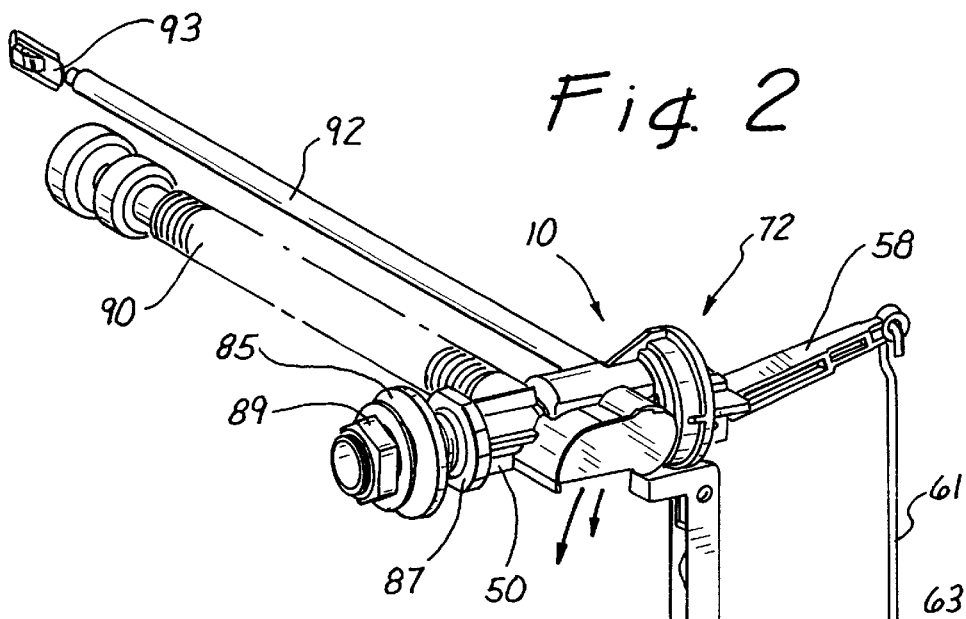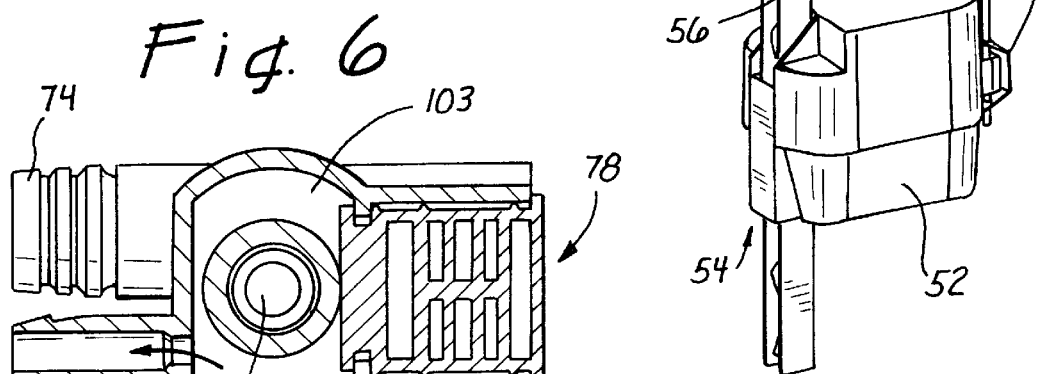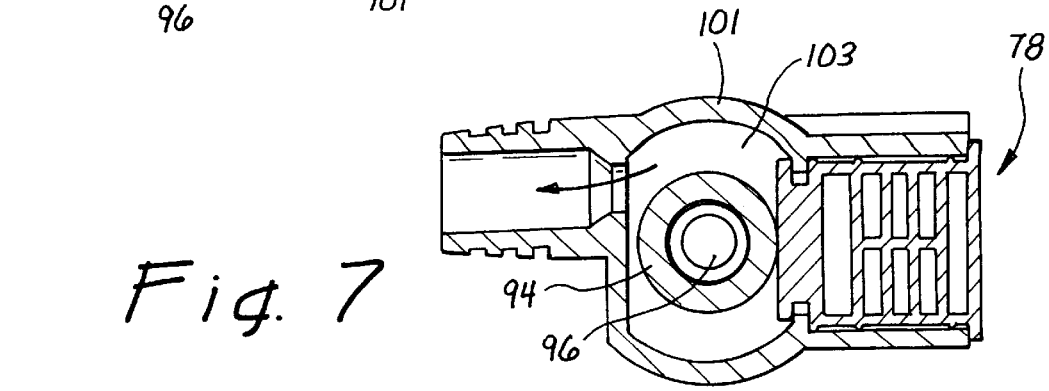

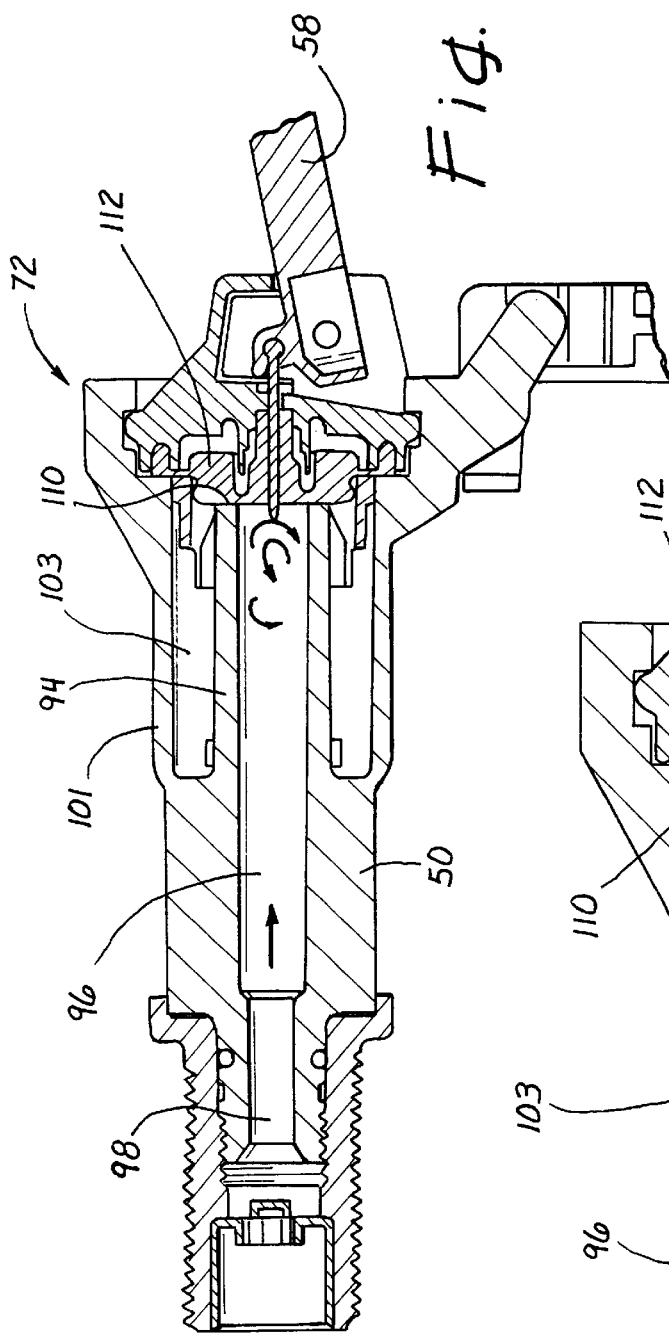
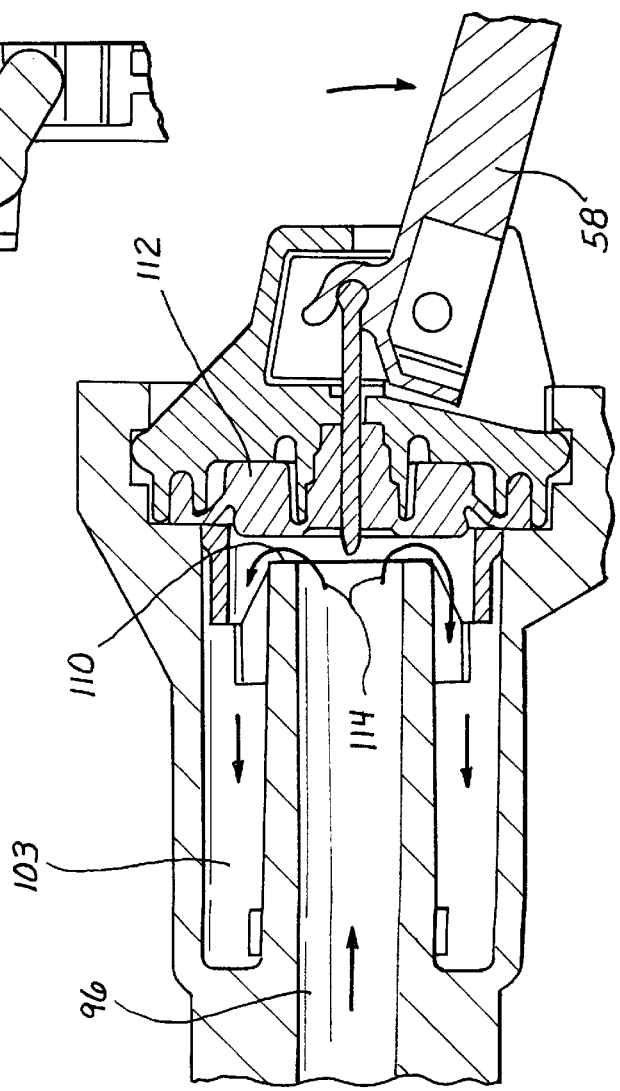

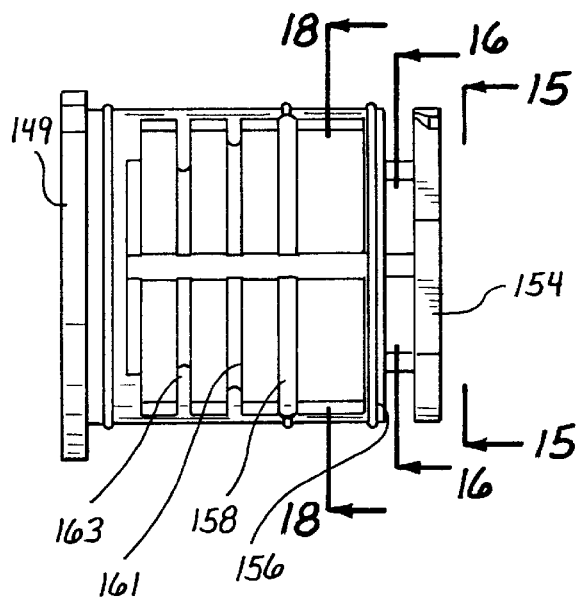
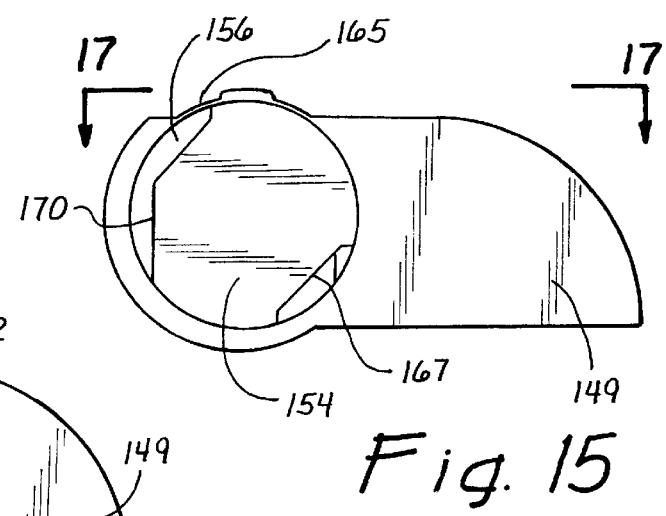
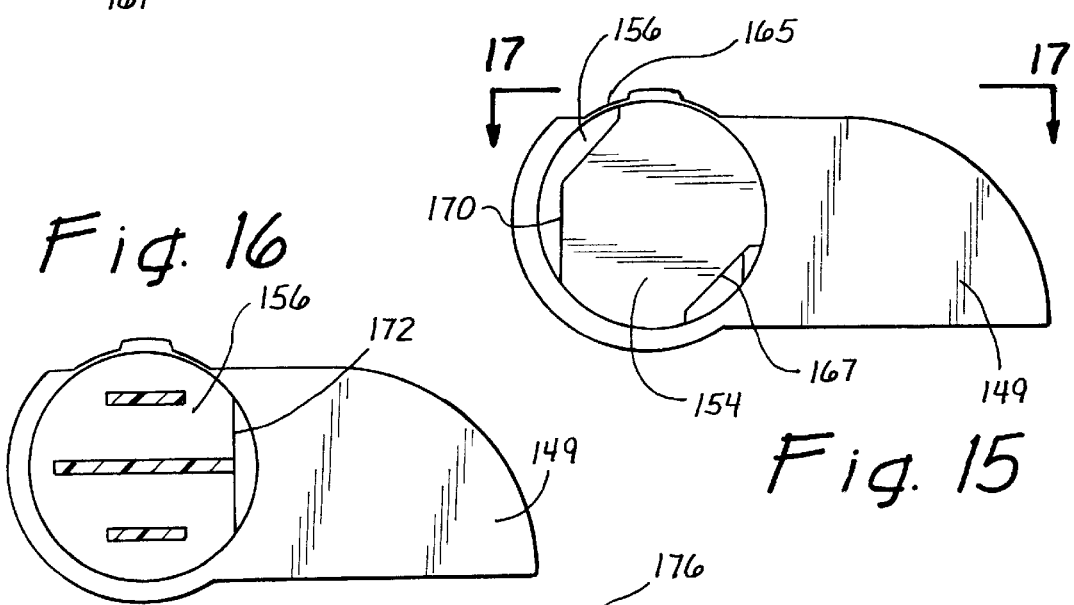
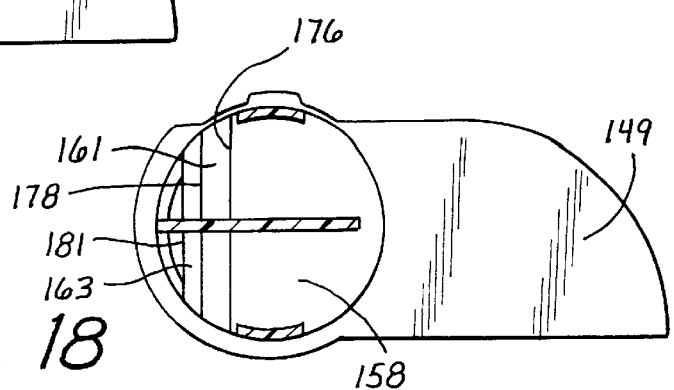

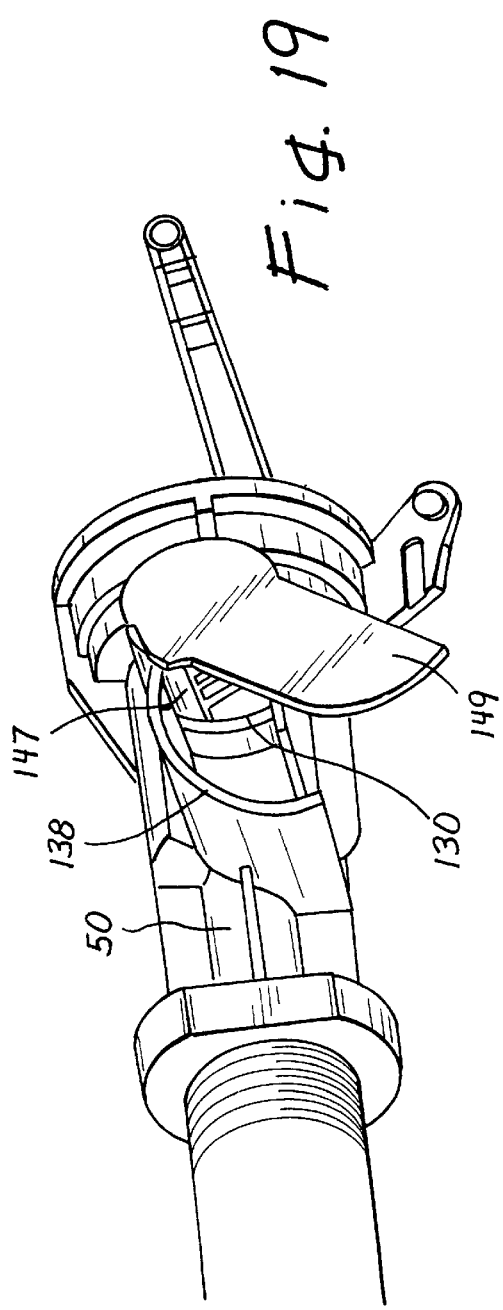
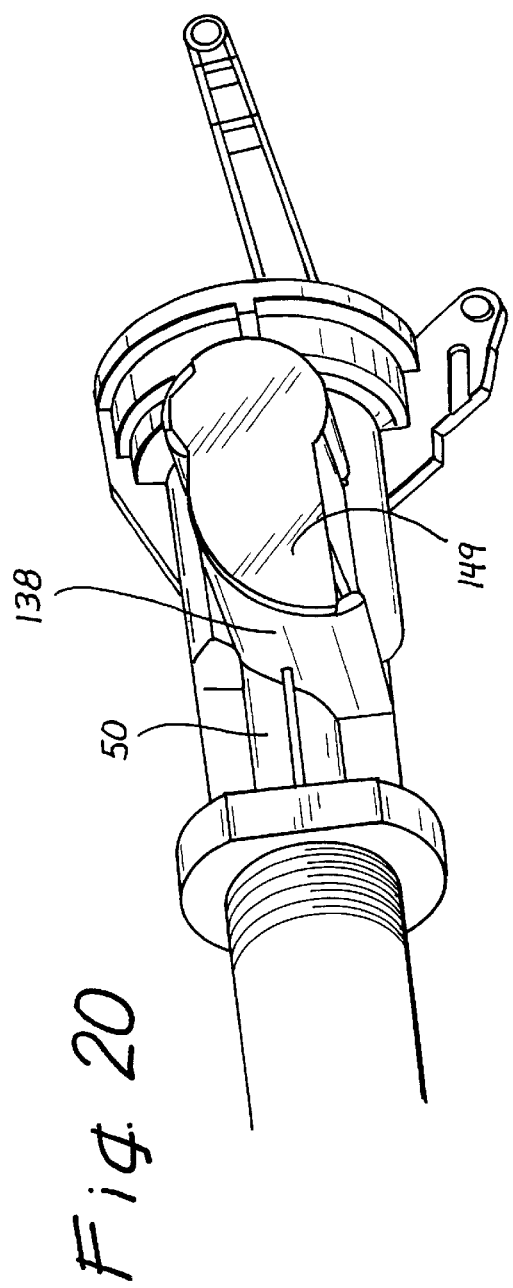

SIDE-MOUNT TOILET VALVE

CROSS REFERENCE TO RELATED APPLICATIONS

This is a non-provisional application claiming priority from provisional application Ser. No. 60/062,876, filed on Oct. 21, 1997 and entitled Reduced Noise Toilet Inlet Valve.

BACKGROUND OF THE INVENTION

1. Field of the Invention

This invention relates generally to apparatus for controlling the flow of water in a toilet, and more specifically, to a toilet reservoir fill valve.

2. Discussion of the Prior Art

Toilets differ widely throughout the world in their size, configuration, features and particularly in their adaptation to different social cultures. Some toilets are adapted to flush merely with water pressure available in the water distribution system of a facility. More commonly, however, toilets are provided with reservoirs which initially fill to a predetermined level and then flush using the stored water.

In this latter example, the toilet commonly includes a bowl and a tank that is supported at the back of the bowl. This tank and its lid define the water reservoir. Water control apparatus associated with this design commonly includes a flush valve through which the stored water empties into the bowl, and a fill valve which initially fills the reservoir through an outside water source. Some fill valves are adapted to be mounted to receive water through the bottom of the tank. In other cases, the fill valves are mounted to receive water through the side of the tank. It is this side-mounted fill valve which is of particular interest to the present invention.

Other toilet structures of interest to the present invention include an overflow pipe which is associated with the flush valve. This pipe extends upwardly in the tank and provides an opening at a level above the water in the tank. From this opening, the overflow pipe bypasses the flush valve and empties directly into the bowl. In addition to providing a safety feature, the overflow tube can be used to initially introduce a small amount of water into the bowl in order to capture a small volume of water during normal, steady state operation. This provides the toilet with a wet-bowl configuration as opposed to a dry-bowl configuration when it is not in use.

Various fill valves of the prior art have provided a primary water outlet for filling the reservoir tank, and secondary outlets to accommodate the sink or a wet bowl configuration as required by a particular toilet.

In some toilet designs, a sink is formed in the lid of the tank and provides an area where the user can wash his/her hands after using the toilet. Since not all toilets have these secondary requirements for water at the sink or the overflow pipe, many different fill-valve configurations have been required in order to provide only those features needed for a particular tank configuration.

For example, fill valves of four designs have been needed to accommodate the four possible combinations of the two secondary water features. One valve provides no water outlets and is therefore adapted for a toilet configuration having neither a wet-bowl configuration nor a sink. A second valve embodiment having a single outlet has been provided to accommodate the relatively large pipe which connects to the wash sink. In this configuration, a dry bowl is contemplated so no separate outlet tube is provided for the overflow pipe. A third inlet valve embodiment has been necessary to accommodate the small outlet tube for those toilets having a wet-bowl configuration but no sink. Still a fourth valve has been required to accommodate toilets having both a sink and a wet-bowl configuration. With this requirement for four separate valves to accommodate the various toilet designs, the industry has had a relatively high inventory requirement. This has been felt not only at the wholesale level, but also in the retail and after-market environments.

In the past, the main water outlet for fill valves has been provided with a screen to aerate the water passing from the valve into the reservoir tank. The water has been permitted to merely fall into the tank, so the aeration has been appreciated in muffling some of the sound. Nevertheless, dumping the water directly into the tank against a substantially perpendicular surface has produce a significant amount of noise, particularly when the tank is empty and the water must fall a significant distance before striking the bottom of the tank.

SUMMARY OF THE INVENTION

In accordance with the present invention, a single fill valve is provided with features which will accommodate each of the four combinations involving a sink and a wet-bowl configuration. Separate outlet pipes are provided for each of the sink and the overflow pipe in order to accommodate a toilet design including both of these features. A plug apparatus is provided which can be totally removed to accommodate both a sink and a wet-bowl configuration. It can be disposed in alternative positions to accommodate only the sink or only the wet-bowl configuration. As a fourth alternative, the plug apparatus can be disposed to seal both the outflow pipes in order to accommodate a toilet design having neither a sink nor a wet-bowl configuration.

The fill valve is also provided with a special outlet construction including a flow channel having a labyrinth of walls which define a circuitous path for the outlet water. These walls aerate the water with a simple structure which can be easily molded and attached to the valve housing with a bayonet structure. This outlet configuration is also adapted to direct the water against a wall of the tank, such as the wall through which the valve receives water. This wall is closely spaced to the valve at a fixed distance from the outlet. This structure minimizes the noise associated with water contacting a surface from a great distance. Furthermore, the water is directed against the wall at an acute angle thereby reducing the noise of impact. The water directed against the wall flows down the wall and silently fills the reservoir of the tank. This construction greatly minimizes the noise previously associated with water cascading into a tank to fill the reservoir.

These and other features and advantages of the invention will become more apparent with the description of preferred embodiments and reference to the associated drawings.

DESCRIPTION OF THE DRAWINGS

FIG. 2 is a perspective view of the fill valve and associated float together with the outlet orifice outlet pipe and outlet tube associated with the present invention;

FIG. 3 is an axial cross-section view of the valve in a closed state;

FIG. 4 is an enlarged axial cross-section view of the valve in an open state;

FIG. 6 is a cross-section view taken along line 6—6 of FIG. 5;

FIG. 7 is a cross-section taken along lines 7—7 of FIG. 5;

FIG. 14 is a side view of the aerator illustrated in FIG. 13;

FIG. 15 is a view of the aerator taken along lines 15—15 of FIG. 14;

FIG. 16 is a cross-section view taken along lines 16—16 of FIG. 14;

FIG. 18 is a cross-section view taken along lines 18—18 of FIG. 14;

FIG. 19 is a perspective view illustrating the aerator of FIG. 15 initially inserted into the body of the valve; and FIG. 20 is a perspective view similar to FIG. 19 and illustrating the aerator rotated into its final operative position.

DESCRIPTION OF THE PREFERRED EMBODIMENTS AND BEST MODE OF THE INVENTION

Figure 1:
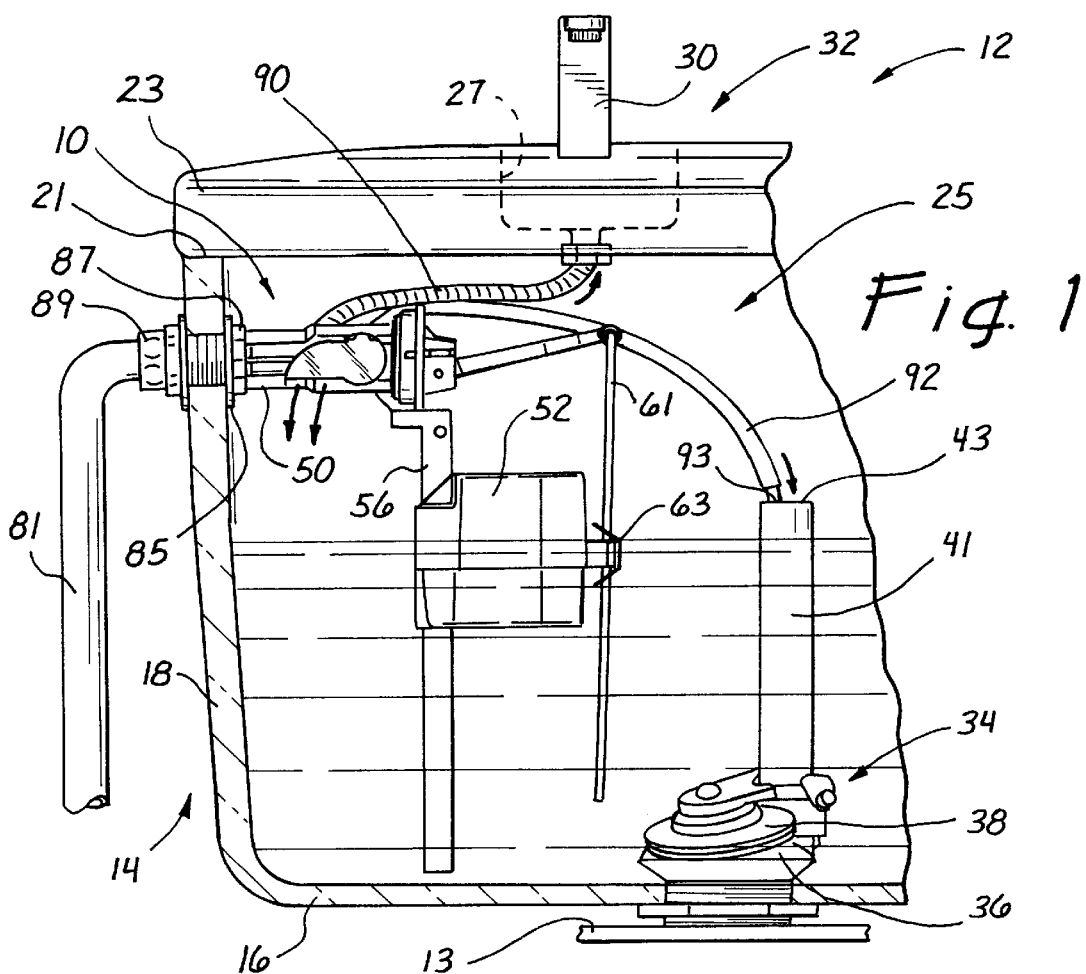
FIG. 1 is a side elevation view of a toilet tank partially in section and illustrating one embodiment of the fill valve of the present invention.

A toilet fill valve is illustrated in FIG. 1 and designated generally by the reference numeral 10. This valve 10 is adapted for use with a toilet 12 having a bowl 13 and a tank 14 which is generally supported above the bowl 13. The tank 14 will commonly include a horizontal bottom wall 16, and four side walls 18 extending upwardly to a rim 21. A removable top 23 is supported on the rim 21 and defines with the walls 16, 18 a reservoir 25. The lid 23 is typically removable to provide access to the water control apparatus, such as the valve 10, inside the tank 14. In this particular embodiment, the lid 23 includes a cavity which forms a sink 27 that empties directly into the reservoir 25. This sink 27 has an associated faucet 30 which provides a wash station 32 on top of the tank 14.

In addition to the fill valve 10, other water control apparatus are commonly mounted within the tank 14. For example, a flush valve 34 controls the output of water from the reservoir 25 into the bowl 13. This flow of water is associated with the flushing the toilet 12. The valve 34 commonly includes a valve seat 36 which provides access through the bottom wall 16 of the tank 14, and a typically hollow, pivotal flapper valve 38. In operation, the flapper valve 38 initially forms a seal with the seat 36 but is removable from the seat 36 to initiate the flushing of the toilet 12. Once removed, the flapper valve 38 stays in a spaced relationship with the seat 36 as it floats on top of the descending water in the tank 25. When the water is substantially empty from the reservoir 25, the flapper valve 38 again forms a seal with the seat 36.

An overflow tube 41 is commonly formed as part of the structure associated with the valve 34. This tube 41 extends upwardly within the reservoir 25 and has an opening 43 at its upper end which is above the predetermined level of water in the tank 14. The bottom end of the tube 41 bypasses the valve 34 and extends directly into the bowl 13. One of the purposes of the overflow tube 41 is to insure that water introduced into the tank 14 does not reach the level of the rim 21 and thereby create flooding. Alternatively, when the water extends beyond the predetermined level and reaches the height of the opening 43, it will flow into the overflow tube 41 and bypass the valve 34 as it passes into the bowl 13. From the bowl 13, this overflow water will automatically go into the sewer so that flooding is totally avoided.

Figure 5:
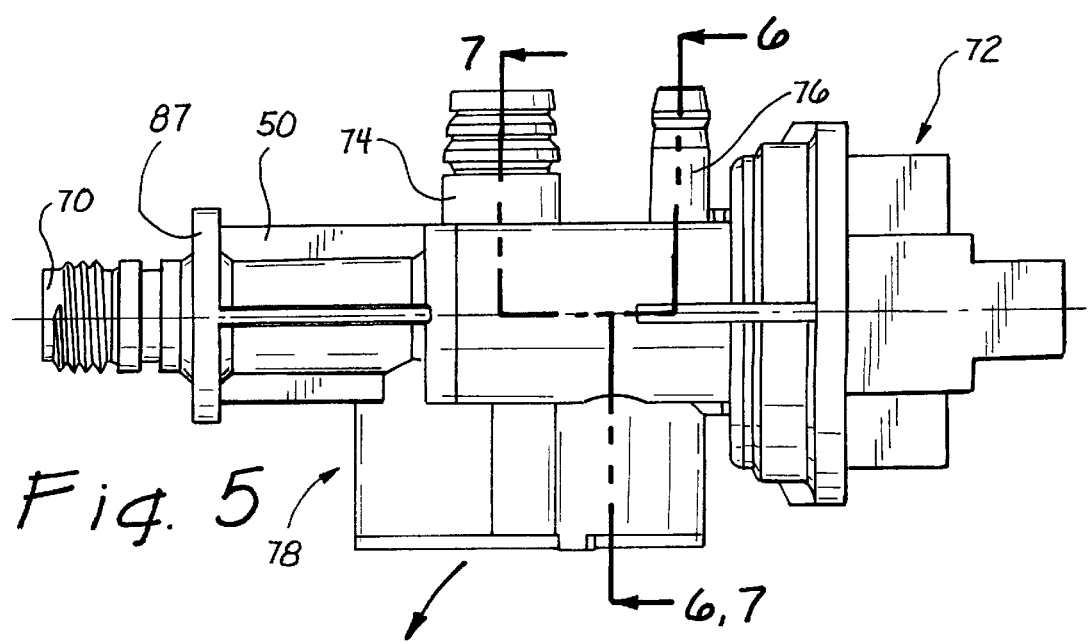
FIG. 5 is a top plan view of the valve showing the outlet assembly, outlet pipe, and outlet tube associated with the present invention.

As illustrated in FIG. 1 and FIG. 2, the fill valve 10 of this embodiment includes a housing 50 and float 52 having a vertical channel 54 which is sized to receive a guide member 56 pivotally mounted to the housing 50. A valve lever 58 is pivotally mounted on the valve assembly 72 and coupled through a rod 61 to the float 52. The position of the float 52 relative to the rod 61 is variable by adjustment of a clip 63 to control the predetermined level of the water in the tank 14. As best illustrated in FIG. 5, this embodiment of the valve 10 includes an inlet tube 70 at one end of the housing 50, and a valve assembly 72 at the other end of the housing 50. Extending latterly of the housing 50 are an outlet pipe 74, an outlet tube 76, and an outlet orifice assembly 78.

When operably mounted within the tank 14, the inlet tube 70 is connected through the wall 18 to an inlet pipe 81 as illustrated in FIG. 1. The valve 10 is held in this position by compression of a sealing washer 85 between a housing flange 87 and a nut 89 screw threaded onto the inlet tube 70. Fluid communication between the outlet pipe 74 and the faucet 30 can be provided by a flexible pipe 90. Similarly, fluid communication between the outlet tube 76 and the opening 43 in the overflow pipe 41 can be provided by a tube 92 terminating in a clip 93.

As best illustrated in FIGS. 3 and 4, the housing 50 of the valve 10 includes an inner wall 94 having a cylindrical configuration and defining a primary channel 96 along an axis 98. An outer wall 101 of the housing 50 defines a secondary channel 103 with the inner wall 94. The secondary channel 103 is also cylindrical in configuration and concentric with the primary channel 96. Water flowing into the valve 10 through the inlet tube 70 initially passes into the primary channel 96. However, flow of this water from the primary channel 96 into the secondary channel 103 is controlled by operation of the valve assembly 72.

This assembly 72 includes a valve seat 110, which in this embodiment, is formed by the inner wall 94, and an associated valve element 112 which is movable relative to the seat 110 to control fluid communication between the primary channel 96 and secondary channel 103. The position of the valve element 112 relative to the valve seat 110 is controlled by operation of the float 52 and hence the rod 61 and lever 58 best illustrated in FIG. 2. When the lever 58 is in the uppermost position, the valve element 112 forms a seal with its associated valve seat 110 so that water is prevented from flowing from the primary channel 96 into the secondary channel 103. This is the steady state condition typically associated with water at the predetermined level within the reservoir 25.

When a flush is initiated, the float 52 descends with the water level pulling the rod 61 and associated lever 58 into a lower position best illustrated in FIG. 4. In this position, the valve element 112 is removed from its associated valve seat 110 and water is free to flow from the primary channel 96 into the secondary channel 103 as illustrated by arrows 114. As the water within the reservoir 25 rises to the predetermined level, the lever 58 moves from the lower position, illustrated in FIG. 4, to the upper position, illustrated in FIG. 3, closing the valve element 112 against the valve seat 110.

As illustrated in FIG. 5, the outlet pipe 74, outlet tube 76 and outlet orifice assembly 78 are all connected in fluid communication with the secondary channel 103. Accordingly, when the lever 58 is not in the upper position as illustrated in FIG. 3, water flows into the secondary channel 103 and outwardly through the outlet pipe 74, outlet tube 76, and outlet orifice 78. This provides water at the faucet 30 through the flexible pipe 90 to activate the wash station 32. It also provides water through the tube 92 and into the overflow tube 41 to fill the bowl 13 of the toilet 12. Water in the secondary channel 103 also flows through the outlet orifice assembly 78 to fill the reservoir 25 to its predetermined height. The outlet pipe 74, outlet tube 76, and outlet orifice 78 are perhaps best illustrated in the cross-sectional views of FIGS. 6 and 7.

Figure 8:
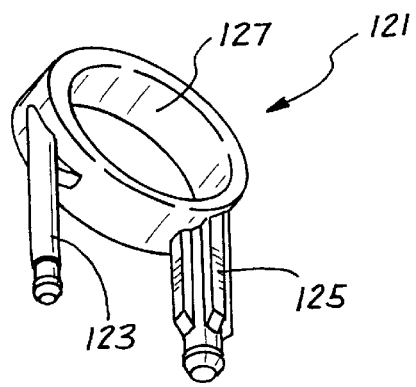
FIG. 8 is a perspective view of a plug assembly associated with one embodiment of the present invention.
Figure 9:
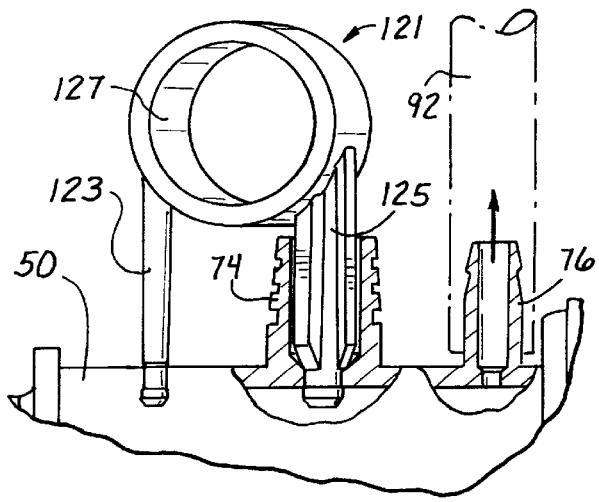
FIG. 9 is a top plan view of the plug assembly in a sealing relationship with the outlet pipe.

Referring now to FIG. 8, another feature associated with the invention is illustrated in the form of a plug assembly 121 having a small plug 123 parallel with a large plug 125, and both integrally connected to a finger ring 127. A detent can be added at each end of the plugs in order to maintain them in their operative positions. This plug assembly 121 is adapted to function in combination with the outlet pipe 74 and outlet tube 76 in various combinations in order to attempt the fill valve 10 to a wide variety of toilets. These toilets would include the toilet 12 which has a sink 27, and is further adapted for a wet-bowl configuration. In this toilet 12, both the outlet pipe 74 and the outlet tube 76 are open to facilitate water flow through the associated pipe 90 and tube 92. The fill valve 10 is also adapted for use with toilets which are adapted for a wet-bowl configuration but have no sink, such as the sink 27. In this case, the plug assembly 121 can be used to plug the outlet pipe 74 as illustrated in FIG. 9. This is accomplished by merely inserting the large plug 125 into the outlet pipe 74 thereby blocking any flow of water from the second channel 103 through the outlet pipe 74.

Figure 10:
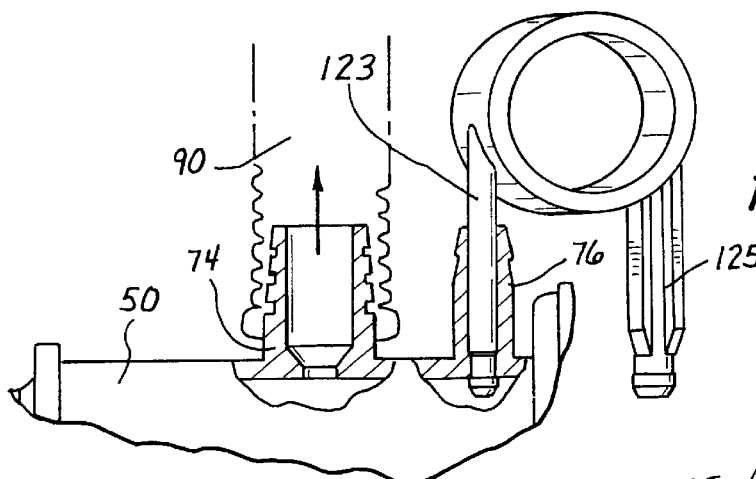
FIG. 10 is a top plan view of the plug assembly in a sealing relationship with the outlet tube of the present invention.

The fill valve 10 is also adapted for use with toilets having a sink, such as the sink 27, but are designed for a dry-bowl configuration. For these toilets, the plug assembly 121 can be used to plug the outlet tube 76 and thereby inhibit any flow of water from the second channel 103 through the outlet tube 76. This is accomplished by merely inserting the first plug 123 of the plug assembly 121 into the outlet tube 76 as illustrated in FIG. 10.

Figure 11:
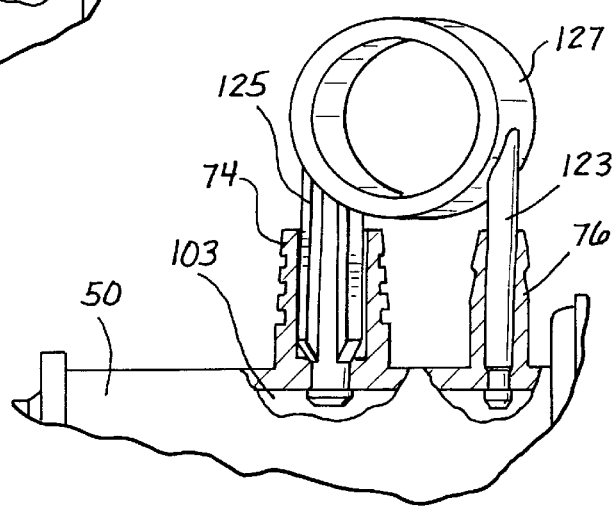
FIG. 11 is a top plan view of the plug assembly in a sealing relationship with both the outlet pipe and the outlet tube associated with the present invention.

The fill valve 10 is also adapted for use with toilets which have neither the sink 27 nor a wet-bowl configuration. For toilets of this type, the plug assembly 121 can be oriented so that the small plug 123 seals the outlet tube 76, and the large plug 125 seals the outlet pipe 74 as illustrated in FIG. 11. With this configuration, there is no flow of water from the second channel 103 through either the outlet pipe 74 or the outlet tube 76. In order to accommodate this configuration of the fill valve 10, the plug assembly 121 is formed with the first tube 123 and the second tube 125 in a generally parallel relationship and separated a distance equivalent to the separation of the output pipe 74 and output tube 76. This enables both the pipe 74 and tube 76 to be sealed with a single plug assembly 121 as illustrated in FIG. 11.

It will be appreciated that the volume of water available during the flush period will vary with the water pressure. For example, in a preferred embodiment, the amount of water for distribution to the sink 27, the tank 14, and the bowl 13 is about 3.78 liters at 5 psi and 11.73 liters at 35 psi. In an embodiment including the sink 27, tank 12, and bowl 13 it is generally felt that about 20% of the available water volume should be made available through the outlet tube 76 to refill the bowl 13. Approximately 50% of the available water volume should be made available to the faucet 30 at the wash station 32. About 30% of the available water volume should be made available to fill the reservoir 25 in the tank 14.

Figure 12:
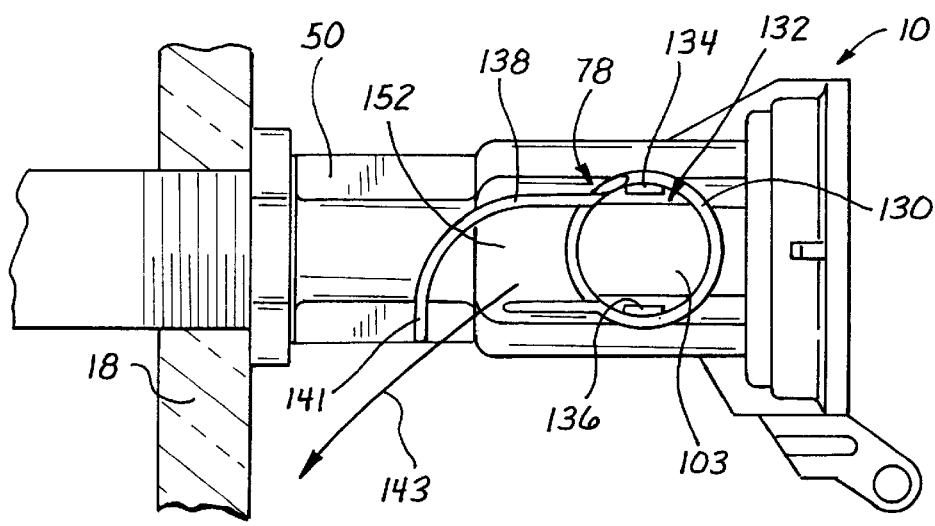
FIG. 12 is a side elevation view of the fill valve of the present invention mounted on a tank wall and best illustrating the flow of water through an output orifice assembly.
Figure 13:
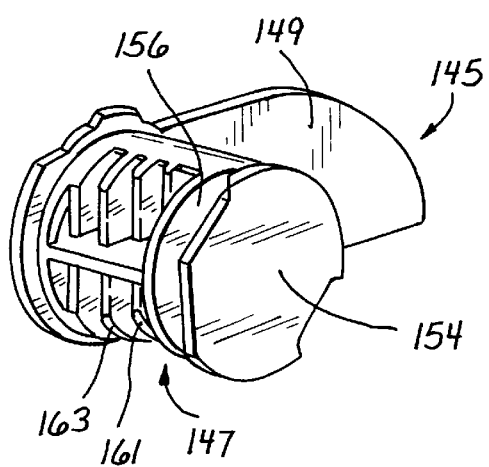
FIG. 13 is a perspective view of an aerator which forms part of the outlet orifice assembly.
Figure 17:
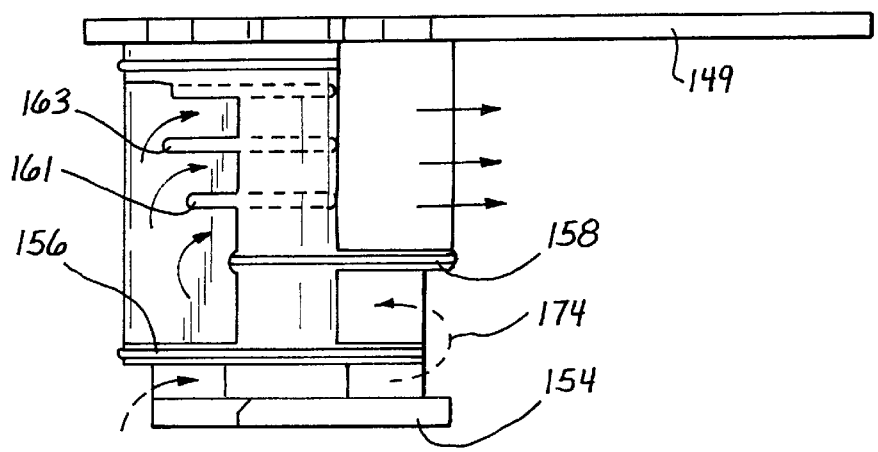
FIG. 17 is an enlarged top view taken along lines 17—17 of FIG. 15.

Referring now to FIG. 12, it will be apparent that the output orifice assembly 78 is of particular interest to the present invention. In the illustrated embodiment, portions of the housing 50 form a skirt 130 which defines a circular output orifice 132. Bayonet flanges 134 and 136 extend inwardly of the orifice 132 from the skirt 130. A skirt extension 138 extends axially of the orifice 132 and then curves radially to form a deflector 141. Water passing through the output orifice 132 is directed along the extension 138 and the deflector 141 to impinge on a near wall of the toilet 12, such as the side wall 18 which supports the fill valve 10. This deflection of the water is illustrated in FIG. 12 by an arrow 143. By deflecting the water directly onto the nearest wall, such as the side wall 18, the noise associated with refilling the tank 14 is greatly reduced. By directing the water along the arrow 143 to engage the wall 18, the water merely flows down the wall 18 and silently into the reservoir 25. In this embodiment, there is no water falling directly from the fill valve 10 to impinge on the perpendicular surface at the bottom wall 16 of the tank 14.

In a preferred embodiment, the water output from the orifice assembly 78 is further quieted by an aerator 145 best illustrated in FIGS. 13–17. In this embodiment, the aerator 145 includes a plug 147 and a side wall 149. The plug 147 is intended for operative disposition within the cylindrical skirt 130 with the side wall 149 cooperating with the extension 138 and the deflector 141 to define an output channel 152.

As illustrated in FIGS. 14–17, the plug 147 of the aerator 145 includes a labyrinth of walls 154, 156, 158, 161 and 163 which direct the water from the second channel 103 and into the output channel 152. These walls 154–163 are generally parallel to each other and generally perpendicular to the flow of the water passing radially outwardly of the second channel 103.

The first wall contacted by the water is the inner most wall 154, best illustrated in FIG. 15. This wall is generally circular in shape except for three sections 165, 167 and 170 which are cut along the circular parameter of the wall 154. These sections, 165, 167 and 170 form with the skirt 130 outlet openings through which the water can pass to reach the second wall 156.

This second wall 156 is best illustrated in FIG. 16 to have a circular configuration except for a section 172 which is formed along the perimeter of the wall 156. A hole formed by this section 172 and the skirt 130 permits the water to pass into contact with at least one of the third, fourth and fifth walls 158, 161, and 163, respectively. Along this water path, best illustrated in FIG. 17 by a dotted arrow 174, the water is turned 180 degrees around the wall 156 as it passes through the section 172.

As the water continues along the path 174, it is directed through channels formed by the walls 158, 161 and 163.

These walls 158, 161 and 163 extend progressively outwardly to associated straight edges 176, 178 and 181, best illustrated in FIG. 18.

The labyrinth of walls represented by the plug 147 in this embodiment functions to introduce turbulence to the water flowing through the orifice assembly 78. This turbulence tends to aerate the water so that its impingement on a hard surface, such as the wall 18, does not create a splashing noise. By aerating the water with the output orifice assembly 78 and directing the water against the wall 18, the operation of the fill valve 10 in filling the tank 14 is substantially silent.

Further reference to FIGS. 19 and 20 will illustrate how the aerator 145 can be molded as a single unit and adapted for mounting in a bayonet relationship with the housing 50. In order to achieve this result, the aerator 145 is inserted with the plug 147 disposed within the skirt 130. Initially, the aerator 145 is angularly displaced from its axial operable position in order that the bayonet flanges 134, 136 can be received in the opposing sections 165 and 167 of the wall 154 (FIG. 15). Once the tabs 134 and 136 have been received in the sections 165 and 167, respectively, the aerator 145 can be rotated within the cylindrical skirt 130 to bring the side wall 149 into alignment with the extension 138 as illustrated in FIG. 20.

From this discussion of preferred embodiments, it will be apparent that many of the features associated with the fill valve 10 can be achieved with other structures. For example, the labyrinth of walls forming the plug 147 can be replaced with other wall configurations to achieve the aeration desired for this output orifice assembly 78. Other connection systems suitable to mount the aerator 145 with respect to the housing 50 may also be of interest. Certainly the plug assembly 121 can be varied to provide alternative plug configurations for a wide variety of toilets.

Given these wide variations, which are all within the scope of this concept, one is cautioned not to restrict the invention to the embodiments which have been specifically disclosed and illustrated, but rather encouraged to determine the scope of the invention only with reference to the following claims.

What is claimed is:

1. A fill valve adapted for use with a toilet having a tank and a bowl, the fill valve comprising:
   a housing in fluid communication with an external water source;
   an outlet pipe having a first diameter and being coupled to the housing, the pipe being adapted to provide fluid communication between the housing and a basin in the presence of a requirement for a wet basin configuration; and
   an outlet tube having a second diameter different than the first diameter and being coupled to the housing, the tube being adapted to provide fluid communication between the housing and the bowl of the toilet in the presence of a requirement for a wet bowl configuration;
   a device for blocking at least one of the pipe and the tube in order to adapt the fill valve for use with the toilet in the absence of a requirement for at least one of the wet basin configuration and the wet bowl configuration; and
   a first plug included in the blocking device for blocking the outlet pipe;
   a second plug included in the blocking device for blocking the outlet tube; and
   a finger tab integral with the first plug and the second plug in the blocking device.

2. The fill valve recited in claim 1, further comprising:
   first portions of the housing defining a primary channel coupled to the external water source;
   second portions of the housing defining a secondary channel coupled to the pipe and the tube; and
   a valve disposed between the primary channel and the secondary channel.

3. The fill valve recited in claim 2, further comprising an outlet assembly adapted to provide fluid communication between the secondary channel and the tank.

4. The fill valve recited in claim 3, wherein the outlet assembly includes:
   a deflector adapted for directing fluid flow against a side wall of the tank; and
   an aerator for aerating the fluid flowing through the outlet assembly into the tank.

5. A fill valve for a toilet having a tank and a bowl, the fill valve comprising;
   a housing in fluid communication with an external water source;
   an outlet pipe coupled to the housing and adapted to provide fluid communication between the housing and a wash basin associated with the tank of the toilet;
   an outlet tube coupled to the housing and providing fluid communication between the housing and the bowl of the toilet in order to maintain a wet bowl configuration;
   a device for blocking at least one of the pipe and the tube in order to adapt the fill valve for the toilet in the absence of at least one of the wash basin and the wet bowl configuration;
   a first plug included in the blocking device for blocking the pipe in the absence of the wash basin;
   a second plug included in the blocking device for blocking the tube in the absence of the wet bowl configuration; and
   a finger tab joining the first plug in a substantially parallel relationship with the second plug.

6. A blocking device adapted for use with a toilet fill valve having an outlet pipe adapted to provide water at a wash station associated with a first toilet in a wet basin configuration, and an outlet tube adapted to provide water to a bowl associated with the first toilet in a wet bowl configuration, comprising:
   a first plug for blocking the outlet pipe in order to adapt the fill valve for use with a second toilet not having a wet basin configuration;
   a second plug for blocking the outlet tube in order to adapt the fill valve for use with a third toilet not having a wet bowl configuration; and
   a finger tab integral with the first plug and the second plug.

7. The blocking device recited in claim 6, wherein:
   the first plug has a longitudinal configuration;
   the second plug has a longitudinal configuration; and
   the first plug is generally parallel to the second plug.

8. The blocking device recited in claim 7, wherein:
   the first plug has a first diameter; and
   the second plug has a second diameter less than the first diameter of the first plug.

9. The blocking device recited in claim 8, wherein:
   the first plug has a central core and a plurality of flanges extending radially outwardly to center the central core in the pipe.

10. The blocking device recited in claim 6 where the finger tab comprises a circular ring.

11. A method for adapting a toilet fill valve for alternative use with a first toilet devoid of a wet bowl, a second toilet devoid of a basin, a third toilet devoid of a wet bowl and a basin, and a fourth toilet having a wet bowl and a basin, comprising the steps of:

provoding the fill valve with an outlet pipe connectable to a toilet bowl;

providing the fill valve with an outlet tube connectable to a toilet basin;

alternatively:

a) adapting the fill valve for use with the first toilet by blocking the outlet pipe;

b) adapting the fill valve for use with the second toilet by blocking the outlet tube;

c) adapting the fill valve for use with the third toilet by blocking both the outlet pipe and the outlet tube; and d) adapting the fill valve for use with the fourth toilet by connecting the outlet pipe to the bowl of the fourth toilet and connecting the outlet tube to the basin of the fourth toilet.

* * * * *